(12) United States Patent
Kuroda et al.

(10) Patent No.: US 12,428,067 B2
(45) Date of Patent: Sep. 30, 2025

(54) VEHICLE-BODY LOWER STRUCTURE OF VEHICLE

(71) Applicant: Mazda Motor Corporation, Hiroshima (JP)

(72) Inventors: Ippei Kuroda, Hiroshima (JP); Masaya Nishimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 456 days.

(21) Appl. No.: 18/125,125

(22) Filed: Mar. 23, 2023

(65) Prior Publication Data

US 2023/0373566 A1    Nov. 23, 2023

(30) Foreign Application Priority Data

May 23, 2022    (JP) .................. 2022-083944

(51) Int. Cl.
*B62D 25/02*    (2006.01)
*B62D 21/15*    (2006.01)
*B62D 27/02*    (2006.01)
*B62D 25/04*    (2006.01)

(52) U.S. Cl.
CPC .......... *B62D 25/025* (2013.01); *B62D 21/15* (2013.01); *B62D 27/023* (2013.01); *B62D 25/04* (2013.01)

(58) Field of Classification Search
CPC ..... B62D 25/025; B62D 21/15; B62D 27/023
USPC ..................... 296/209, 187.09, 187.1, 29, 30
See application file for complete search history.

(56) References Cited

U.S. PATENT DOCUMENTS

| 10,189,505 | B2* | 1/2019 | Narahara ............. B62D 25/025 |
| 11,273,870 | B2* | 3/2022 | Muraoka ................ B62D 25/04 |
| 2016/0194032 | A1 | 7/2016 | Yamamoto et al. |

FOREIGN PATENT DOCUMENTS

JP    2015-058749 A    3/2015

* cited by examiner

*Primary Examiner* — Dennis H Pedder
(74) *Attorney, Agent, or Firm* — XSENSUS LLP (57) ABSTRACT

A side sill in a lower part and on an outer side in a vehicle width direction of a vehicle and forms, in its inner part, a closed cross section that extends in a front-rear direction of the vehicle; the side sill includes a side sill outer that has a front end and a main body located behind the front end, an outer-side reinforcement member that has a shape extending along a front face part and a side face part of the front end of the side sill outer is joined to the front end from inside or outside the closed cross section, a front end of the main body is opposed to a rear end of a side face part of the outer-side reinforcement member in the front-rear direction, and the main body has a protrusion part that protrudes to the inner side of the closed cross section.

14 Claims, 10 Drawing Sheets

VEHICLE-BODY LOWER STRUCTURE OF VEHICLE

CROSS-REFERENCE TO RELATED APPLICATION

The present application claims priority to Japanese Patent Application 2022-083944, filed May 23, 2022, the entire contents of which are incorporated herein by reference.

BACKGROUND

Field

The present disclosure relates to a vehicle-body lower structure of a vehicle including, for example: a side sill that forms a closed cross section extending in a front-rear direction of a vehicle on an outer side in a vehicle width direction; and a wheel that is located ahead of the side sill.

Description of the Related Art

Typically, at the time of a so-called small overlap collision in which a barrier partially collides, from ahead of a vehicle, with a front face of the vehicle at an end part located outward of a front side frame in the vehicle width direction, a wheel pulled back collides with a side sill front end part, and thus a collision load directed to the rear side of the vehicle is input to the side sill front end part. Such a collision load directed to the rear side of the vehicle is transmitted to the rear side of the side sill through the side sill front end part, which is preferable because it can inhibit a vehicle body from being reinforced excessively.

Meanwhile, the vehicle side structure of Patent document 1 is proposed as a configuration including a reinforcement member that reinforces a side sill front end part against a small overlap collision.

The vehicle side structure of Patent document 1 is provided, on an inner face in the vehicle width direction of a side sill outer front end part located on the outer side in the vehicle width direction of a side sill front end part, with an outer-side reinforcement member (30) that reinforces at least a front face and an outer face in the vehicle width direction of the side sill outer front end part.

However, since the outer-side reinforcement member (30) extends to the rear side of the side sill further than the side sill front end part, it may lead to an increase in mass and cost.

PRIOR ART DOCUMENTS

Patent Documents

[Patent document 1] JP-A-2015-058749

SUMMARY

The present disclosure has been made in view of such a problem, and aims to provide a vehicle-body lower structure of a vehicle which transmits a rearward collision load, having been input to a side sill front end part, to the rear side of the side sill without an increase in mass and cost.

Means for Solving the Problem

A vehicle-body lower structure of a vehicle according to the present disclosure is characterized by including: a side sill that is disposed in a lower part and on an outer side in a vehicle width direction of a vehicle and has a side sill inner located on an inner side in the vehicle width direction and a side sill outer located on the outer side in the vehicle width direction and having a front end part and a main body part, the side sill inner and the side sill outer collaborating with each other to form a closed cross section that extends in a front-rear direction of the vehicle; a wheel that is located ahead of the side sill outer; and an outer-side reinforcement member that has a shape extending along a front face part and a side face part in the front end part of the side sill outer. The vehicle-body lower structure of a vehicle is characterized in that the outer-side reinforcement member is attached to the front end part from inside the closed cross section or from outside the closed cross section, a front end of the main body part is opposed to a rear end of a side face part of the outer-side reinforcement member in the front-rear direction of the vehicle, and the main body part is disposed closer to the side face part of the front end part than the rear end of the side face part of the outer-side reinforcement member in the vehicle width direction, and has a protrusion part that protrudes to a side opposite the side of the side face part of the front end part relative to the rear end.

According to the above configuration, when a rearward collision load is input to the side sill from the front side, by using the outer-side reinforcement member, the side sill outer front end part tries to be displaced rearward while keeping its shape. In this event, the rear end of the outer-side reinforcement member pulled back engages with the front end of the protrusion part provided to the main body part of the side sill outer, so that the load is transmitted from the outer-side reinforcement member to the main body part located there behind.

Accordingly, it is possible to transmit the rearward collision load, having been input from the front side to the side sill, rearward without an increase in mass and cost.

As an aspect of the present disclosure, it is preferable that the side face part of the outer-side reinforcement member is provided with an extension part that extends rearward of the front end of the main body part.

According to the above configuration, when the outer-side reinforcement member is pulled back by a rearward collision load having been input from the front side to the side sill, the extension part can engage with the side face part of the main body part and thereby restrict movement of the outer-side reinforcement member in the vehicle width direction relative to the main body part.

Accordingly, it is possible to cause the rear end of the outer-side reinforcement member pulled back and the protrusion part provided to the main body part to engage with each other more reliably and thereby enhance the load transmission efficiency from the outer-side reinforcement member to the main body part.

As another aspect of the present disclosure, it is preferable that the protrusion part is formed by a bead that extends in the front-rear direction in the main body part.

According to the above configuration, by forming the protrusion part by a bead, it is possible to enhance the load transmission efficiency of the main body part in the front-rear direction.

As still another aspect of the present disclosure, it is preferable that, in the side face part of the outer-side reinforcement member, a reinforcement member lateral ridge line that extends continuously forward from the rear end is formed to have substantially the same height as a protrusion part lateral ridge line that extends in the front-rear direction in the protrusion part.

According to the above configuration, when a rearward collision load is input from the front side to the side sill, the outer-side reinforcement member is pulled back, which causes the reinforcement member lateral ridge line and the protrusion part lateral ridge line having the same height to extend so as to be continuous in the front-rear direction of the vehicle.

In other words, the rear end of the side face part of the outer-side reinforcement member, which is enhanced in rigidity by the reinforcement member lateral ridge line, and the front end of the protrusion part of the main body part, which is enhanced in rigidity by the protrusion part lateral ridge line, engage with each other (come into contact with each other) firmly. Thus, it is possible to enhance the load transmission efficiency from the outer-side reinforcement member to the main body part.

As still another aspect of the present disclosure, it is preferable that an outer lateral ridge line that extends rearward from the front end of the main body part is formed in a boundary part between an upper face part and a side face part of the main body part, and the extension part has such a configuration as to extend rearward along the outer lateral ridge line so as to be capable of engaging with the upper face part and the side face part of the main body part.

According to the above configuration, when the outer-side reinforcement member is pulled back by a rearward collision load having been input from the front side to the side sill, the extension part engages with not only the side face part but also the upper face part of the main body part. Thus, it is possible to restrict movement of the outer-side reinforcement member in the vehicle width direction and also in a vertical direction relative to the main body part.

This inhibits the height positions of the reinforcement member lateral ridge line and the protrusion part lateral ridge line from becoming out of alignment relative to each other when the outer-side reinforcement member is pulled back, and thereby enables the reinforcement member lateral ridge line and the protrusion part lateral ridge line to extend so as to be continuous in the front-rear direction of the vehicle more reliably.

As still another aspect of the present disclosure, it is preferable that the protrusion part has a pair of lateral wall parts that extend in the vehicle width direction while being spaced from each other in a vertical direction of the vehicle, and at least one of the pair of lateral wall parts overlaps with the rear end of the outer-side reinforcement member in a front view of the vehicle.

According to the above configuration, since at least one of the pair of lateral wall parts overlaps with the rear end of the outer-side reinforcement member in the front view of the vehicle, it is possible to cause the outer-side reinforcement member pulled back and the main body part to engage with each other reliably when a rearward collision load is input to the side sill front end part.

Accordingly, it is possible to enhance the load transmission efficiency from the outer-side reinforcement member to the main body part.

As still another aspect of the present disclosure, it is preferable that a rear end concave part that is concave forward from the rear end is formed in the outer-side reinforcement member at the same height position as at least one of the pair of lateral wall parts of the protrusion part.

According to the above configuration, when the outer-side reinforcement member is pulled back by a collision load directed to the rear side of the vehicle having been input from the front side of the side sill, the circumferential edge of the rear end concave part engages with one of the lateral wall parts of the protrusion part that has the same height as the rear end concave part.

Accordingly, it is possible to cause the rear end of the outer-side reinforcement member pulled back and the protrusion part provided to the main body part to engage with each other more reliably and thereby enhance the load transmission efficiency from the outer-side reinforcement member to the main body part.

As still another aspect of the present disclosure, it is preferable that the outer-side reinforcement member is provided to the front end part from the closed cross section side.

According to the above configuration, it is possible to make the outer-side reinforcement member more compact and simpler in shape than the case where the outer-side reinforcement member is provided to the front end part from outside the closed cross section, and thereby suppress its weight increase. Further, in the case of forming the outer-side reinforcement member by molding, it is possible to enhance its formability.

As still another aspect of the present disclosure, it is preferable that a boundary in the front-rear direction of the vehicle between the front end part and the main body part of the side sill outer is located at a position within a longitudinal width of a hinge pillar that extends upward from the side sill.

According to the above configuration, the lower part of the hinge pillar is connected to the side sill while extending across the front end part and the main body part. Thus, when a rearward collision load is input to the side sill front end part, the load can be transmitted more reliably from the front end part to the main body part located on the rear side of the vehicle.

Advantages

According to the above configuration, it is possible to transmit a rearward collision load, having been input to a side sill front end part, to the rear side of the side sill without an increase in mass and cost.

DETAILED DESCRIPTION

Hereinbelow, an embodiment of the present disclosure will be described in detail based on the drawings.

Note that, since a side face of a vehicle-body lower structure 1 of a vehicle according to this embodiment is substantially symmetric, a description will be made based on a right-side vehicle lower structure. In the drawings, an arrow F indicates a front side of the vehicle, an arrow U indicates an upper side of the vehicle, an arrow OUT indicates an outer side in a vehicle width direction (vehicle exterior side), and an arrow IN indicates an inner side in the vehicle width direction (vehicle interior side). In addition, in the drawings, a mark "X" indicates a spot welding part.

Figure 1:
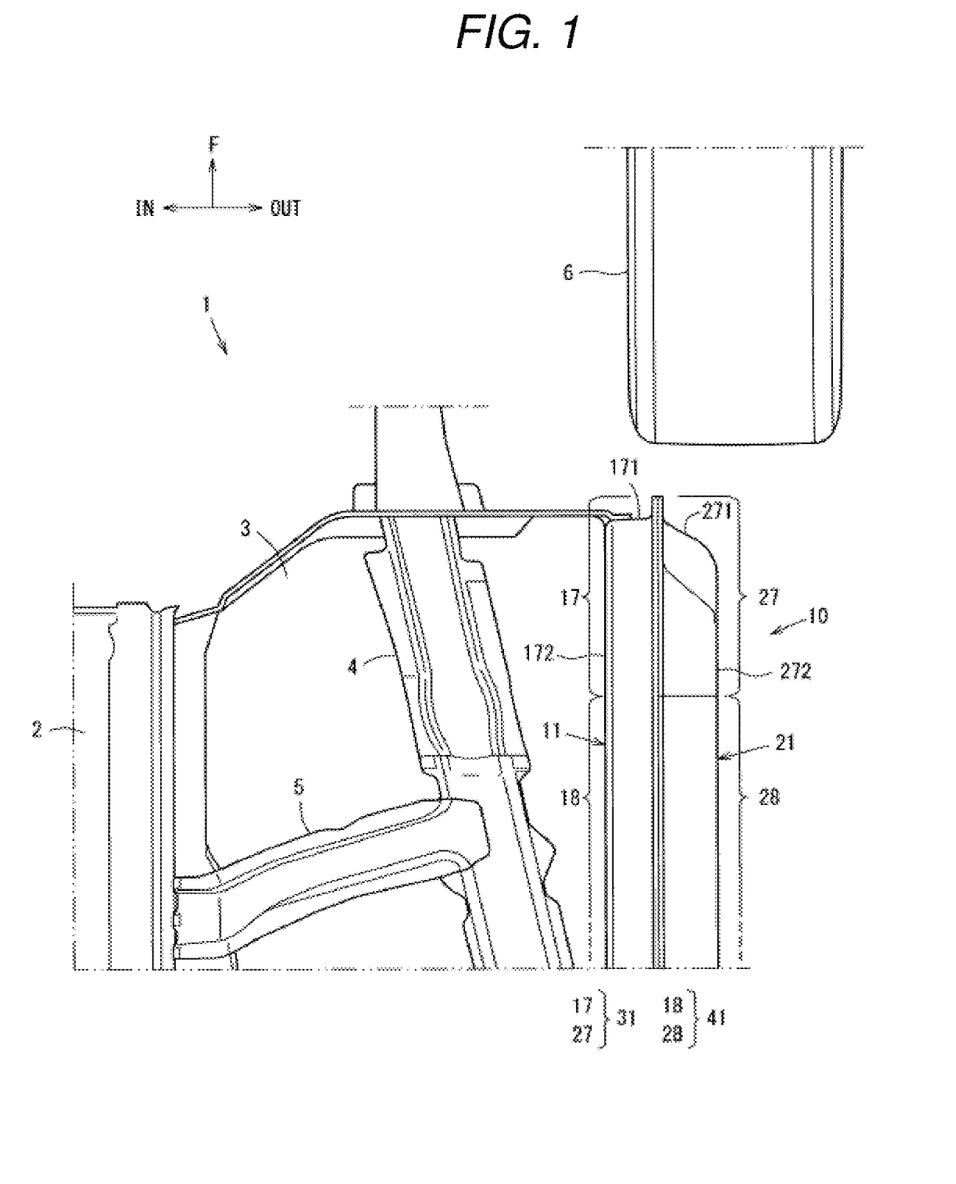
FIG. 1 is a plan view illustrating a chief part of a vehicle lower part according to this embodiment.
Figure 2:
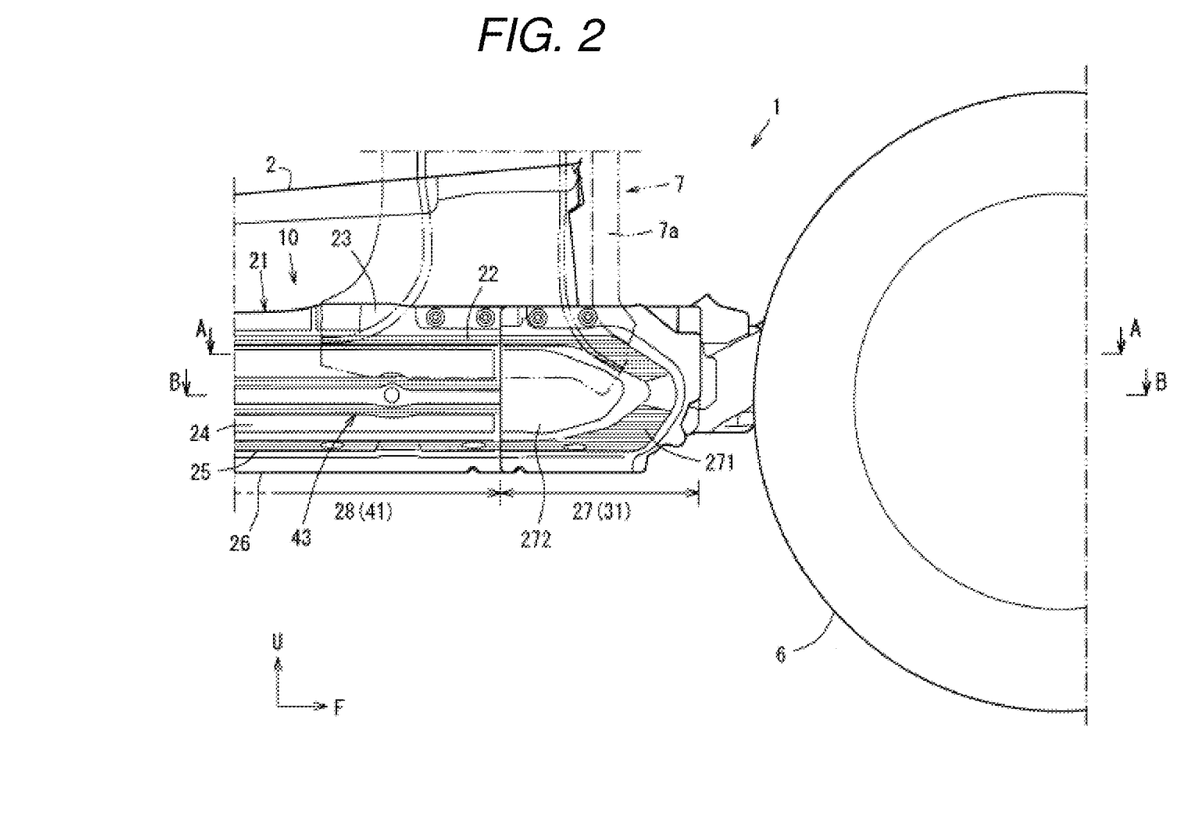
FIG. 2 is a side view illustrating the chief part of the vehicle lower part according to this embodiment.

As illustrated in FIGS. 1 and 2, the vehicle-body lower structure 1 of this embodiment is provided with a tunnel part 2 that protrudes upward and extends in a front-rear direction at the center in the vehicle width direction of a bottom face of a vehicle interior. A platy floor panel 3 (see FIG. 1) forming a floor face of the vehicle interior is disposed horizontally on the bottom face of the vehicle interior at each of right and left sides of the tunnel part 2. Each of right and left end parts of the bottom face of the vehicle interior includes a side sill 10 that extends in the front-rear direction. The floor panel 3 on each of the right and left sides has an outer end part in the vehicle width direction that is joined to an inner face in the vehicle width direction of the corresponding one of the right and left side sills 10. Note that, as illustrated in FIG. 1, the floor panel 3 is provided with a floor frame 4 that extends in the front-rear direction and a cross member 5 that extends in the vehicle width direction.

As illustrated in FIGS. 1 and 2, the vehicle body is provided with a wheel 6 as a front wheel at a position ahead of the side sill 10. The wheel 6 is disposed ahead of a front end of the side sill 10 and disposed at a position coinciding at least partially with the side sill 10 in the vehicle width direction.

As illustrated in FIG. 1, in this embodiment, the wheel 6 has an inner end in the vehicle width direction that is disposed outward in the vehicle width direction of an inner end in the vehicle width direction of the side sill 10, and the wheel is disposed closer to the outer side in the vehicle width direction than the side sill 10. Note that more than half of an upper side of the wheel 6 is covered with an arch-shaped wheel house.

A lower part of a hinge pillar 7 that extends in a vertical direction along a front edge of a side door opening of the vehicle interior is joined to a front part of the side sill 10 (see the hinge pillar 7 illustrated by a virtual line in FIG. 2). Note that, the lower part of the hinge pillar 7, that is, a base part of the hinge pillar to be joined to the front part of the side sill 10 is formed in such a way that its width in the front-rear direction becomes wider as it goes downward.

The hinge pillar 7 includes a hinge pillar inner that is disposed on the inner side in the vehicle width direction and a hinge pillar outer 7a that is disposed on the outer side in the vehicle width direction. By joining and securing both members to each other, the hinge pillar forms, in its inner part, a closed cross section that extends continuously in the vertical direction.

As illustrated in FIGS. 1 to 7, the side sill 10 includes a side sill inner 11 that has a hat-shaped cross section open outward in the vehicle width direction and a side sill outer 21 that has a hat-shaped cross section open inward in the vehicle width direction. As illustrated in FIGS. 3 to 7, by the side sill inner 11 located on the inner side in the vehicle width direction and the side sill outer 21 located on the outer side in the vehicle width direction collaborating with each other, the side sill 10 forms, in its inner part, a closed cross section 10s that extends continuously in the front-rear direction.

Figure 6:
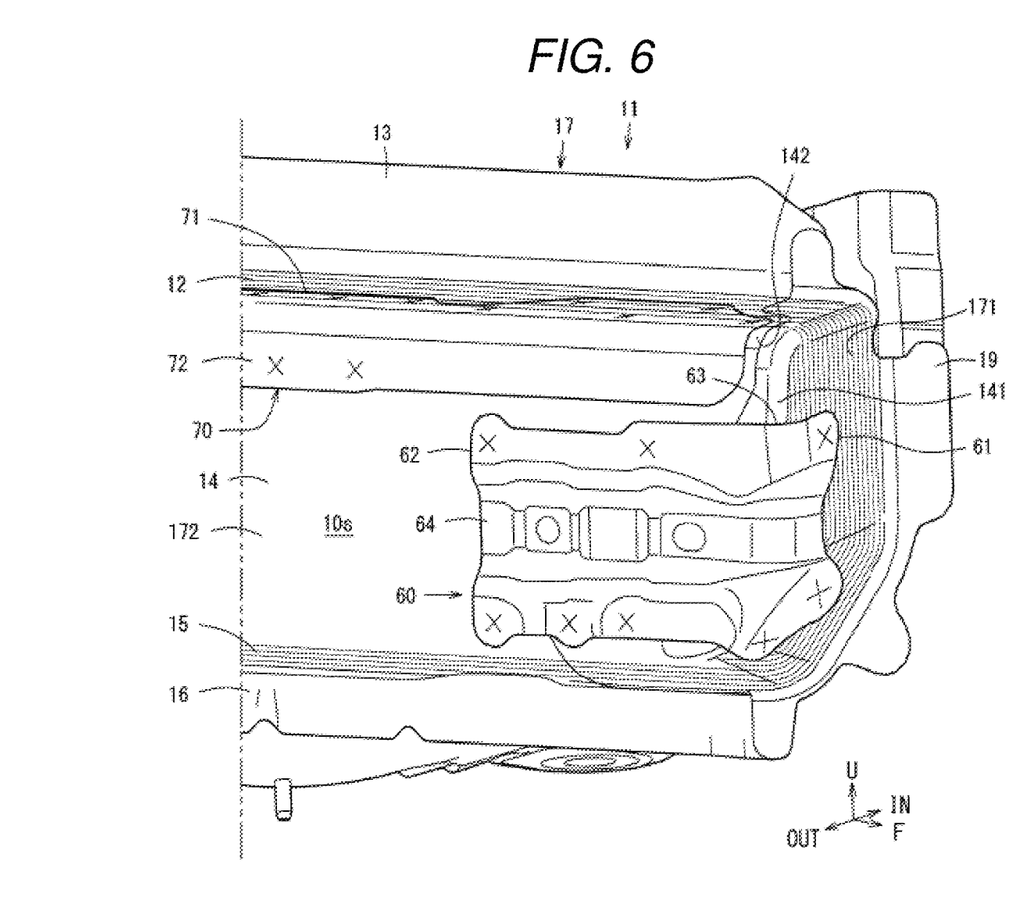
FIG. 6 is a perspective view illustrating a side sill inner front end part and its periphery, viewed from the vehicle exterior side.
Figure 7:
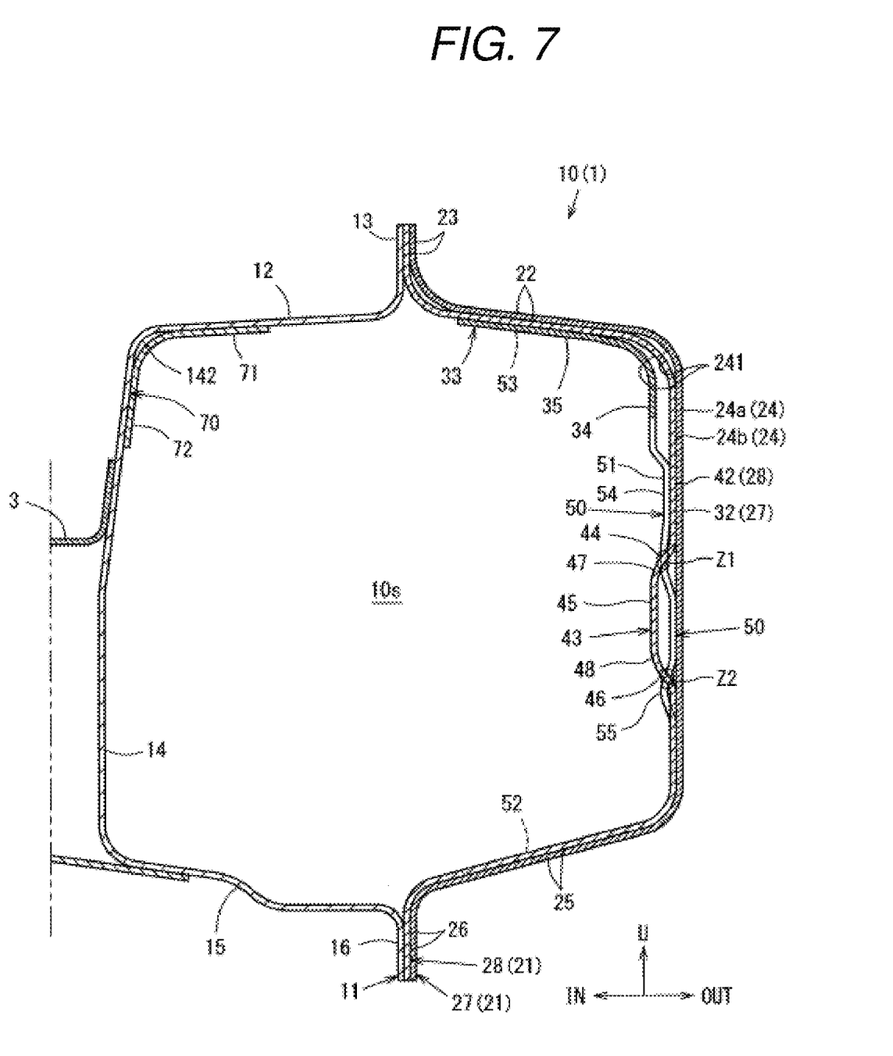
FIG. 7 is a cross-sectional view of the chief part taken along a line C-C of FIG. 3 or 4, viewed along an arrow direction.

Specifically, as illustrated in FIGS. 6 and 7, the side sill inner 11 includes: an inner-side upper face part 12 that extends substantially horizontally; an upper-end flange part 13 that extends upward from an outer edge of the inner-side upper face part 12 in the vehicle width direction; an inner-side side face part 14 that extends downward from an inner edge of the inner-side upper face part 12 in the vehicle width direction; an inner-side lower wall part 15 that extends outward in the vehicle width direction from a lower edge of the inner-side side face part 14; and a lower-end flange part 16 that extends downward from an outer edge of the inner-side lower wall part 15 in the vehicle width direction.

Figure 4:
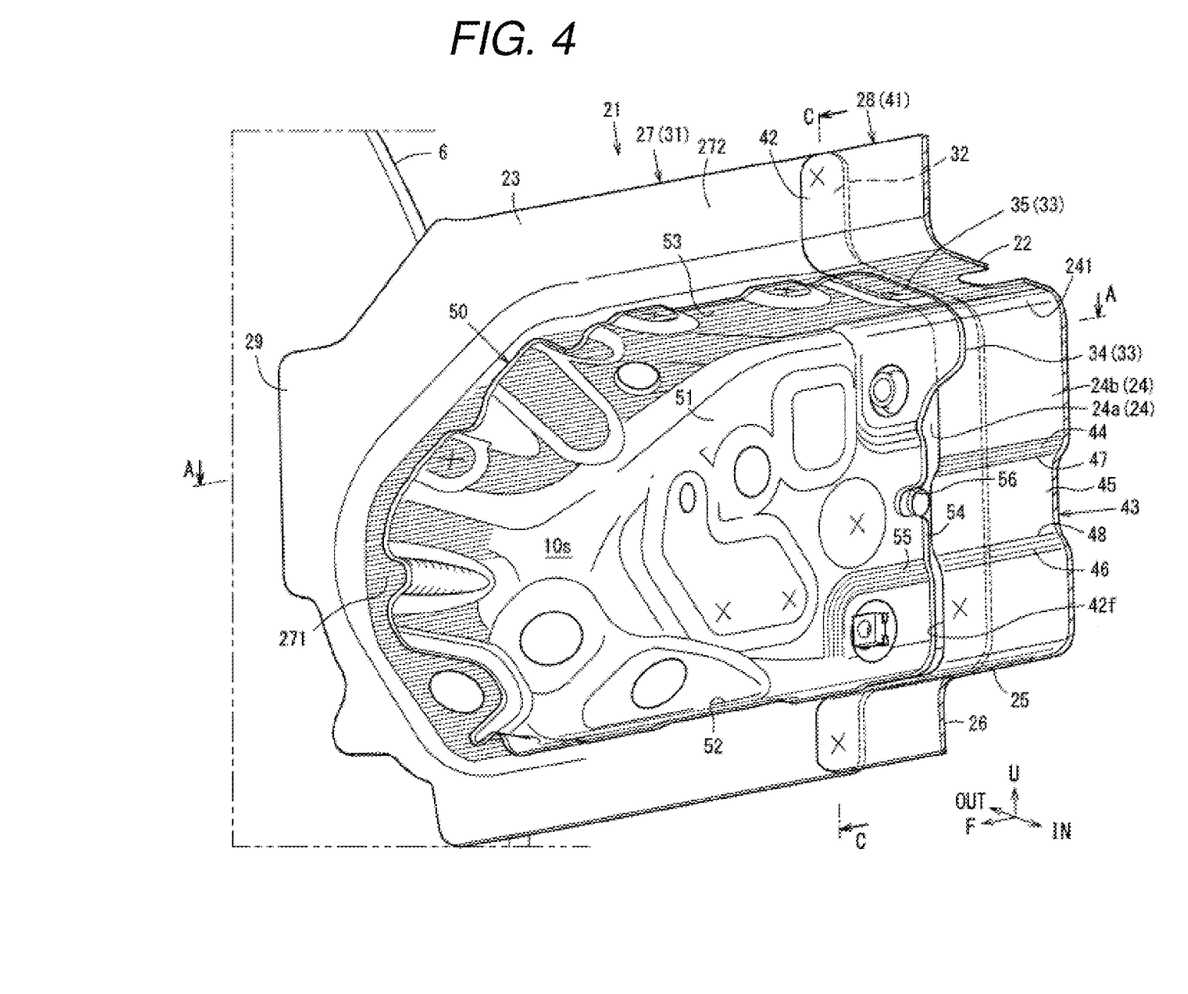
FIG. 4 is a perspective view illustrating a side sill outer front end part and its periphery, viewed from the vehicle interior side.

As illustrated in FIGS. 4 and 7, the side sill outer 21 includes: an outer-side upper face part 22 that extends substantially horizontally; an upper-end flange part 23 that extends upward from an outer edge of the outer-side upper face part 22 in the vehicle width direction; an outer-side side face part 24 that extends downward from the outer edge of the outer-side upper face part 22 in the vehicle width direction; an outer-side lower wall part 25 that extends inward in the vehicle width direction from a lower edge of the outer-side side face part 24; and a lower-end flange part 26 that extends downward from an inner edge of the outer-side lower wall part 25 in the vehicle width direction.

By the upper-end flange parts 13 and 23 of the side sill inner 11 and the side sill outer 21 joined to each other by welding or the like and the lower-end flange parts 16 and 26 thereof joined to each other by welding or the like in a cross-sectional view taken along a plane orthogonal to a longitudinal direction, the side sill 10 forms the closed cross section 10s described above in its inner part.

As illustrated in FIGS. 1 to 6, the side sill 10 described above includes a side sill front end part 31 that extends rearward from the front end of the side sill 10 and a side sill main body part 41 that is substantially wholly disposed behind a rear end of the side sill front end part 31. As illustrated in FIG. 2, a boundary part between the side sill front end part 31 and the side sill main body part 41 corresponds to a position within the longitudinal width of the hinge pillar 7, and to a substantially intermediate position in the front-rear direction of the hinge pillar 7 in this example.

As illustrated in FIGS. 1 to 5 and FIG. 9, the side sill outer 21 includes a side sill outer front end part 27 and a side sill outer main body part 28. As illustrated in FIGS. 1, 3, 5, 6, and 9, the side sill inner 11 includes a side sill inner front end part 17 and a side sill inner main body part 18. The side sill front end part 31 is formed by the side sill outer front end part 27 and the side sill inner front end part 17, and the side sill main body part 41 is formed by the side sill outer main body part 28 and the side sill inner main body part 18.

Figure 3:
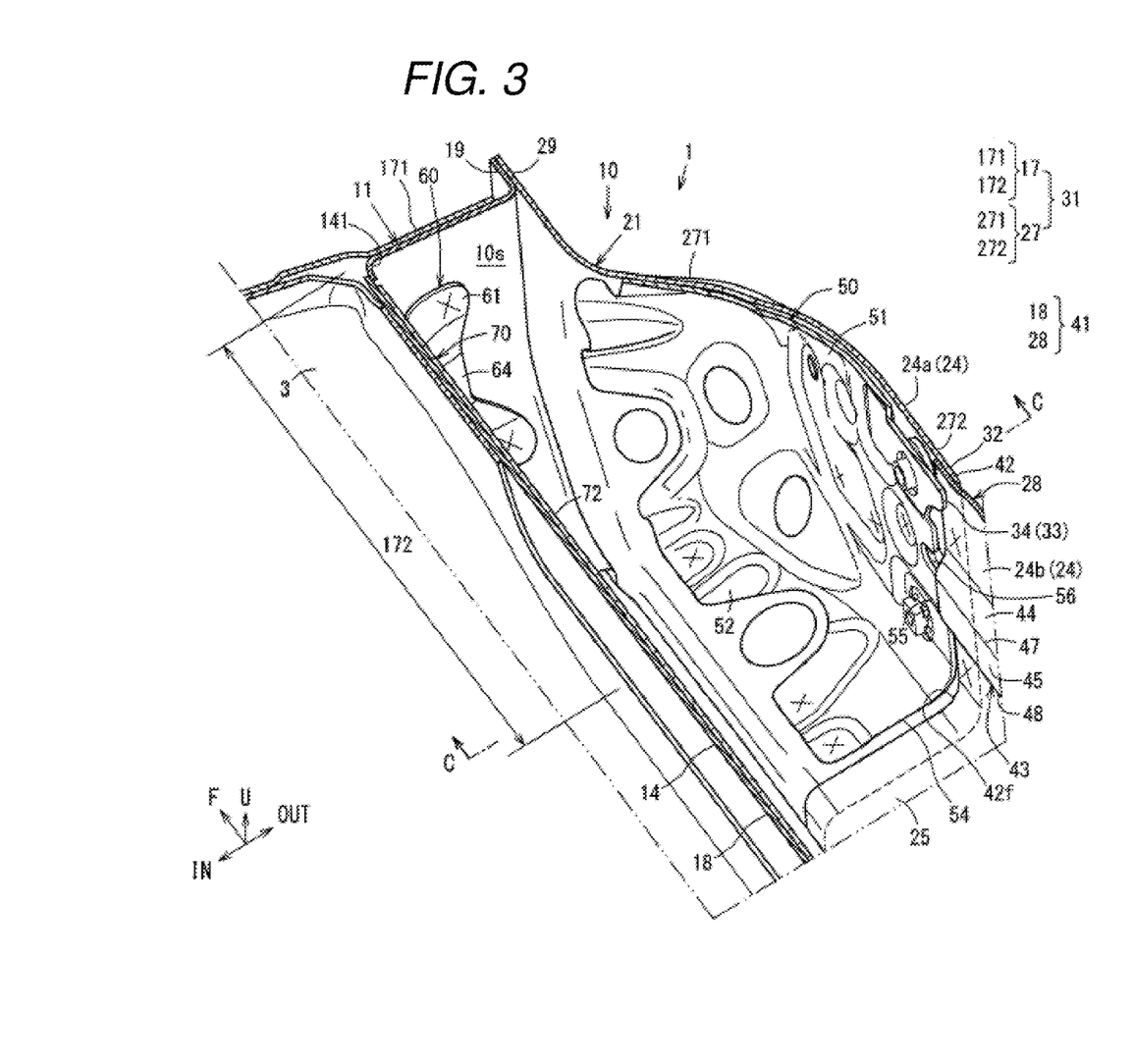
FIG. 3 is a perspective cross-sectional view of the chief part taken along a line A-A of FIG. 2, viewed from an upper and vehicle interior side.
Figure 5:
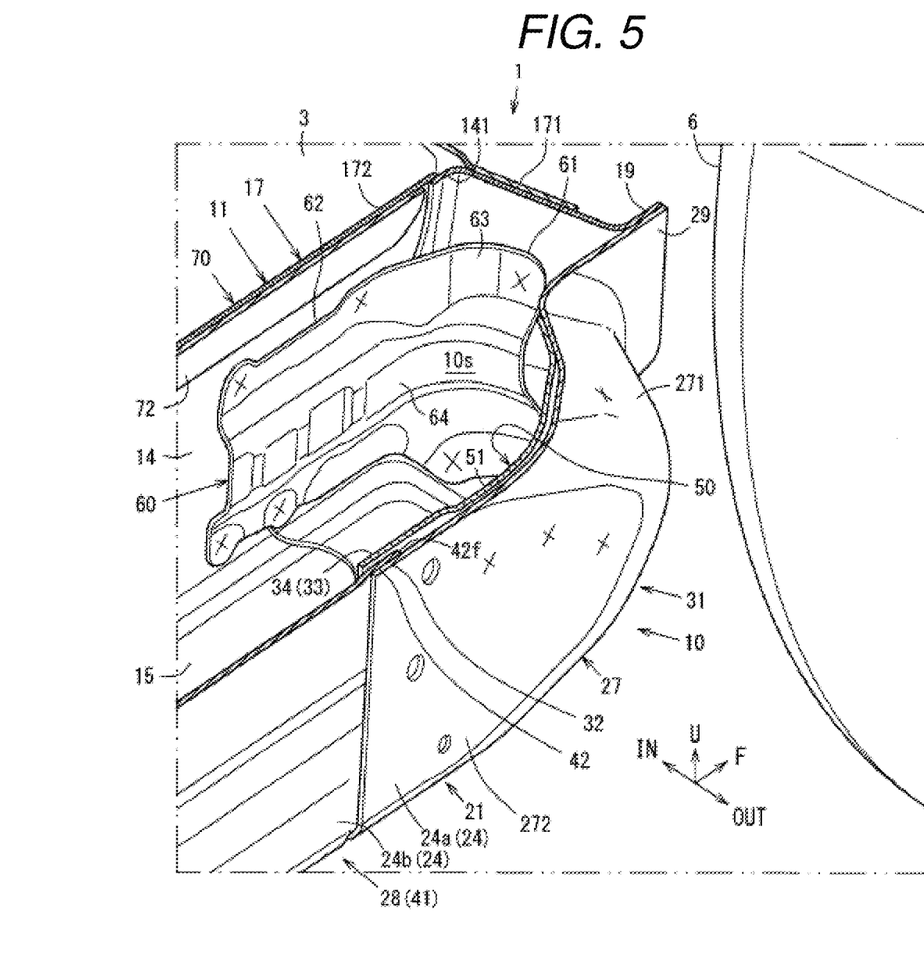
FIG. 5 is a perspective cross-sectional view of the chief part taken along the line A-A of FIG. 2, viewed from a rear and vehicle exterior side.

As illustrated in FIGS. 3 to 5, in a boundary part between the side sill outer front end part 27 and the side sill outer main body part 28, a rear-end flange 32 of the side sill outer front end part 27 and a front-end flange 42 of the side sill outer main body part 28 are joined to each other by spot welding or the like while overlapping with each other in a thickness direction. In this embodiment, the rear-end flange 32 of the side sill outer front end part 27 is joined to the front-end flange 42 of the side sill outer main body part 28 from outside (the outer side in the vehicle width direction of) the closed cross section 10s.

Note that, in this embodiment, although the side sill outer 21 is formed of at least two members constituted of the side sill outer front end part 27 and the side sill outer main body part 28 as illustrated in FIGS. 1 to 5, the side sill outer may be formed of a single member that is continuous in the front-rear direction including the boundary part of these parts.

On the other hand, in the side sill inner 11, although the side sill inner front end part 17 and the side sill inner main body part 18 are not formed of separate members but formed of a single member as illustrated in FIGS. 1, 3, 5, and 6, these parts may be formed of separate members as front and rear side areas separated by their boundary part.

As illustrated in FIG. 1, FIGS. 3 to 5, and FIG. 9, the side sill outer front end part 27 includes an outer front face part 271 that forms a front wall of the side sill outer 21 and an outer front end rear part 272 that is located behind the outer front face part 271.

As described previously, the outer front face part 271 and the outer front end rear part 272 are formed in a hat shape in cross section open inward in the vehicle width direction (see FIG. 7). However, as illustrated in FIG. 4, the outer front face part 271 is formed in a bowl shape that is gradually reduced in diameter in the vertical direction and the vehicle width direction from a front end of the outer front end rear part 272 toward the front.

Specifically, as illustrated in FIG. 4, as in the outer front end rear part 272, the outer front face part 271 has the outer-side upper face part 22, the upper-end flange part 23, an outer-side side face part 24a (24), the outer-side lower wall part 25, and the lower-end flange part 26. However, as illustrated in FIG. 1, FIGS. 3 to 5, and FIG. 9, the outer-side side face part 24a of the outer front face part 271 gently inclines from a front end of the outer-side side face part 24a of the outer front end rear part 272 to an inner end in the vehicle width direction of the side sill outer 21 as it extends forward.

As illustrated in FIGS. 2 and 4, the outer-side upper face part 22 and the outer-side lower wall part 25 of the outer front face part 271 gently incline from front ends of the outer-side upper face part 22 and the outer-side lower wall part 25 of the outer front end rear part 272 to the vicinity of an intermediate part in the vertical direction of the side sill outer 21 as they extend forward.

Figure 9:
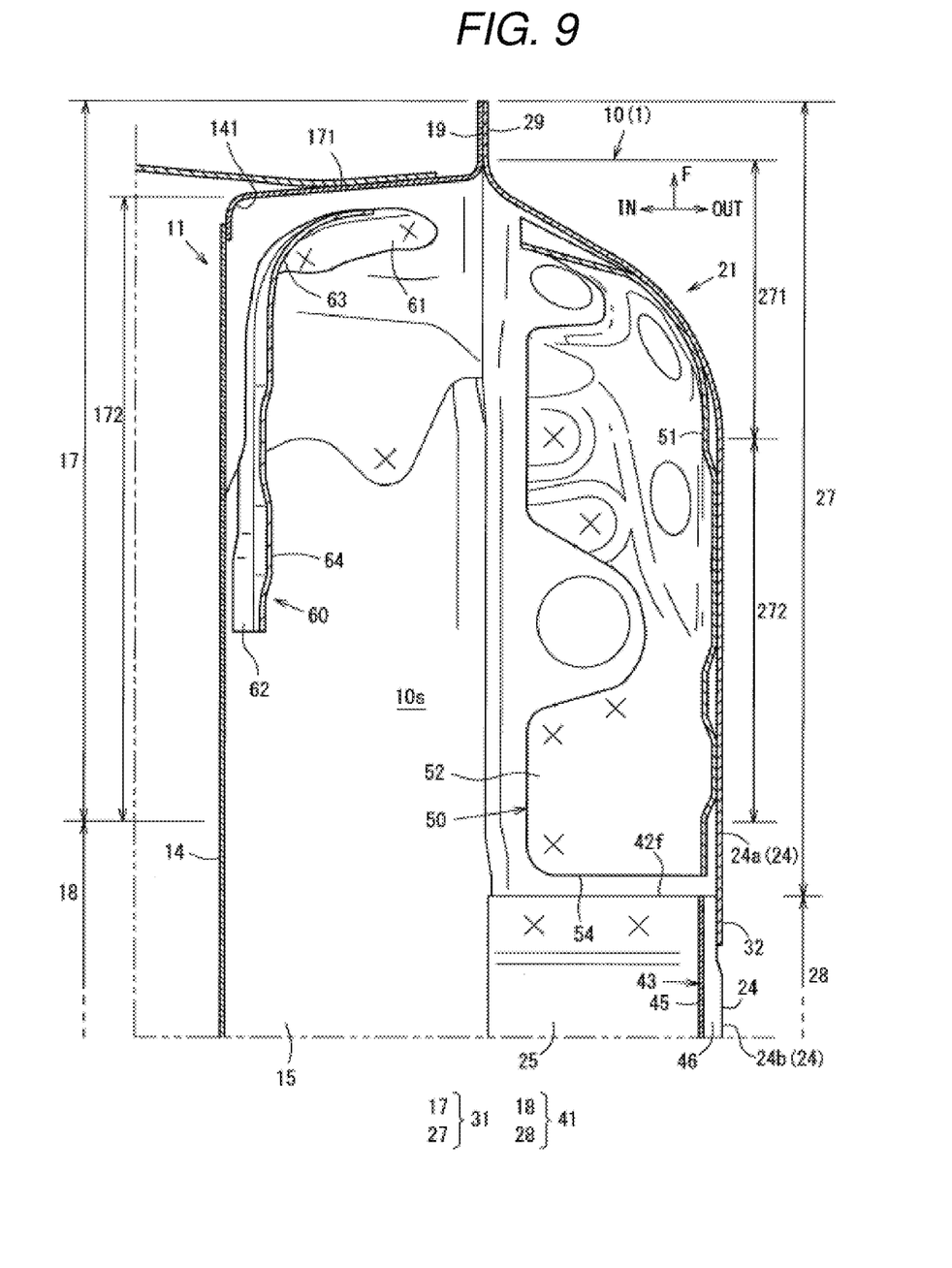
FIG. 9 is a cross-sectional view of the chief part taken along a line B-B of FIG. 2.

In addition, as illustrated in FIGS. 4 and 9, the side sill outer front end part 27 extends smoothly in the front-rear direction while a ridge line extending in the vertical direction along a boundary part between a rear end of the outer front face part 271 and the front end of the outer front end rear part 272 is not formed in the boundary part.

In addition, as described previously, the side sill outer main body part 28 is formed in a hat shape in cross section open inward in the vehicle width direction as described above (see FIG. 4).

Note that, as illustrated in FIG. 4, an outer lateral ridge line 241 is formed in the side sill outer main body part 28 so as to extend in the front-rear direction along a boundary part between the outer-side upper face part 22 and an outer-side side face part 24b (24).

As illustrated in FIGS. 3, 4, and 9, an outer-side protrusion part 43 that protrudes inward in the vehicle width direction from its periphery is provided at a substantially intermediate position in the vertical direction of the outer-side side face part 24b of the side sill outer main body part 28. The outer-side protrusion part 43 extends continuously rearward from a front end 42f of the side sill outer main body part 28.

Note, however, that the outer-side protrusion part 43 may have a configuration such that it does not extend to a rear part of the side sill 10 as long as it has a length in the front-rear direction enough to engage with a rear end 54 of an outer-side reinforcement member 50 to be described later, which is pulled back at the time of a small overlap collision, and to enable the front end 42f to receive the outer-side reinforcement member 50.

As illustrated in FIG. 4, in the outer-side side face part 24b of the side sill outer main body part 28, the outer-side protrusion part 43 has: an upper wall part 44 that stands inward in the vehicle width direction from its periphery; a vertical wall part 45 that extends downward in a vertical wall shape from an inner end in the vehicle width direction of the upper wall part 44; and a lower wall part 46 that stands inward in the vehicle width direction from its periphery to a lower end of the vertical wall part 45.

In other words, the outer-side protrusion part 43 protrudes to the same side as the side on which the outer-side reinforcement member 50 is laid over the side sill outer front end part 27 (to the inner side of the closed cross section 10s).

In a boundary part between the vertical wall part 45 and the upper wall part 44 of the outer-side protrusion part 43, an upper-side lateral ridge line 47 that extends continuously rearward from the front end 42f of the outer-side protrusion part 43 along this boundary part is formed. In addition, in a boundary part between the vertical wall part 45 and the lower wall part 46 of the outer-side protrusion part 43, a protrusion part lower-side lateral ridge line 48 that extends continuously rearward from the front end 42f of the outer-side protrusion part 43 along this boundary part is formed.

As illustrated in FIGS. 3, 5, 6, 8, and 9, the side sill inner front end part 17 includes an inner front face part 171 that forms a front wall of the side sill inner 11; and an inner front end rear part 172 that is located behind the inner front face part 171.

As illustrated in FIG. 6, the side sill inner 11 is formed in such a way that, while the inner front face part 171 is formed in a vertical wall shape extending in the vehicle width direction and the vertical direction, an area extending across the inner front end rear part 172 and the side sill inner main body part 18 (see FIG. 9) is formed in a hat shape in cross section open outward in the vehicle width direction as described above.

Specifically, the side sill inner 11 has a configuration such that the inner-side upper face part 12 extends continuously rearward from an upper end of the inner front face part 171, the inner-side side face part 14 extends continuously rearward from an inner end in the vehicle width direction of the inner front face part 171, and the inner-side lower wall part 15 extends continuously rearward from a lower end of the inner front face part 171, respectively.

As illustrated in FIGS. 5, 6, 8, and 9, in a boundary part between the inner front face part 171 and the inner-side side face part 14, an inner vertical ridge line 141 is formed so as to extend in the vertical direction along this boundary part. Note that, in this embodiment, the inner front face part 171 and the inner front end rear part 172 are formed by separate members, and are joined to each other by welding or the like with their end parts overlapping with each other in the thickness direction in their boundary part (see FIGS. 3, 5, and 6).

In addition, as illustrated in FIGS. 6 and 7, an inner lateral ridge line 142 is formed in the side sill inner 11 so as to extend in the front-rear direction along a boundary part between the inner-side upper face part 12 and the inner-side side face part 14.

Further, as illustrated in FIGS. 3 to 6 and FIGS. 8 and 9, front-end flange parts 19 and 29 that protrude forward are formed at an outer end in the vehicle width direction of the inner front face part 171 and an inner end in the vehicle width direction of the outer front face part 271 described above, respectively. The front-end flange parts 19 and 29 are joined to each other by welding or the like while overlapping with each other in the vehicle width direction.

As illustrated in FIGS. 3 to 5 and FIGS. 7 to 9, the side sill outer front end part 27 includes the outer-side reinforcement member 50 that reinforces the side sill outer front end part 27. The outer-side reinforcement member 50 has a shape extending along the side sill outer front end part 27.

Specifically, as illustrated in the drawings such as FIG. 4, the outer-side reinforcement member 50 is formed in a bowl shape so as to correspond to the bowl-shaped side sill outer front end part 27, and includes: an outer-side side face reinforcement part 51 that extends along the outer-side side face part 24a of the side sill outer front end part 27; an outer-side lower wall reinforcement part 52 that extends along the outer-side lower wall part 25; and an outer-side upper wall reinforcement part 53 that extends along the outer-side upper face part 22.

The outer-side reinforcement member 50 is joined to the side sill outer front end part 27 by welding or the like from inside the closed cross section 10s of the side sill 10 so as to be substantially wholly superimposed on the side sill outer front end part.

As illustrated in the drawings such as FIG. 4, the outer-side reinforcement member 50 is formed so as to extend over substantially the entire length in the front-rear direction of the side sill outer front end part 27 excluding the front-end flange part 29, and its rear end 54 is substantially wholly located ahead of the front end 42f of the side sill outer main body part 28.

As illustrated in FIGS. 3 to 5 and FIGS. 7 and 8, an extension part 33 that extends rearward of the front end 42f of the side sill outer main body part 28 is provided in an upper part of the rear end 54 of the outer-side reinforcement member 50. The extension part 33 extends linearly along an outer lateral ridge line 241 of the side sill outer main body part 28 (see FIG. 4).

As illustrated in the drawings such as FIG. 4, the extension part 33 includes an extension part vertical wall 34 that extends rearward from the rear end 54 of the outer-side side face reinforcement part 51 of the outer-side reinforcement member 50 and an extension part upper wall 35 that extends rearward from the rear end 54 of the outer-side upper wall reinforcement part 53 of the outer-side reinforcement member 50. The extension part vertical wall 34 and the extension part upper wall 35 are formed in such a way that an upper end of the extension part vertical wall 34 and an outer end in the vehicle width direction of the extension part upper wall 35 are formed integrally, whereby these walls are formed to substantially have an L shape in a cross-sectional view taken along a plane orthogonal to the direction in which these walls extend.

Both the extension part vertical wall 34 and the extension part upper wall 35 of the extension part 33 extend rearward of the front end 42f of the side sill outer main body part 28. The extension part vertical wall 34 is disposed so as to be attached to the outer-side side face part 24b of the side sill outer main body part 28 from inside (that is, from the inner side in the vehicle width direction of) the closed cross section 10s while being adjacent thereto, and the extension part upper wall 35 is disposed so as to be attached to the outer-side upper face part 22 of the side sill outer main body part 28 from inside the closed cross section 10s (that is, from below) while being adjacent thereto.

In other words, the extension part upper wall 35 of the extension part 33 is superimposed on (engages with) the outer-side upper face part 22 of the side sill outer main body part 28 from below, and the extension part vertical wall 34 of the extension part is superimposed on (engages with) the outer-side side face part 24b of the side sill outer main body part 28 from the inner side in the vehicle width direction.

Note that, as illustrated in FIGS. 3 and 4, the extension part 33 is disposed so that its lower end is located above the upper wall part 44 of the outer-side protrusion part 43 of the side sill outer main body part 28.

In addition, as illustrated in FIGS. 3, 4, and 7 (in particular FIG. 7), a portion of the outer-side side face part 24b of the side sill outer main body part 28 other than the outer-side protrusion part 43 in the vertical direction is located outward in the vehicle width direction of the rear end 54 of the outer-side side face reinforcement part 51 of the outer-side reinforcement member 50. In contrast, the outer-side protrusion part 43 in the outer-side side face reinforcement part 51 of the side sill outer main body part 28 is disposed so that at least the vertical wall part 45 is located inward in the vehicle width direction of the rear end 54 of the outer-side side face reinforcement part 51 of the outer-side reinforcement member 50. Thus, as illustrated in FIG. 7, in the outer-side protrusion part 43 described above, each of the front ends 42f of the upper wall part 44 and the lower wall part 46 (see FIG. 4) overlaps with the rear end 54 of the outer-side side face reinforcement part 51 of the outer-side reinforcement member 50 in a front view (see areas Z1 and Z2 in FIG. 7).

Additionally, as illustrated in FIGS. 3 and 4, a reinforcement member lateral ridge line 55 is formed behind and below the outer-side side face reinforcement part 51 of the outer-side reinforcement member 50 so as to extend forward continuously linearly from the rear end 54 of the outer-side reinforcement member 50. Besides, as illustrated in FIG. 4, the reinforcement member lateral ridge line 55 of the outer-side reinforcement member 50 is formed so as to have substantially the same height as the protrusion part lower-side lateral ridge line 48 of the outer-side protrusion part 43 of the side sill outer main body part 28.

Further, as illustrated in FIGS. 3 and 4, in a rear part of the outer-side side face reinforcement part 51 of the outer-side reinforcement member 50 at a position below the extension part 33 and above the reinforcement member lateral ridge line 55, that is, at substantially the same height position as the upper-side lateral ridge line 47 of the outer-side protrusion part 43 of the side sill outer main body part 28, a rear end concave part 56 is formed so as to be notched forward from the rear end 54. This rear end concave part 56 is open toward the front end 42f of the side sill outer main body part 28.

Furthermore, as illustrated in FIG. 3 and FIGS. 5 to 9, the side sill inner 11 includes an inner-side reinforcement member 60 and an inner lateral ridge line reinforcement member 70 (see FIGS. 3, 5, 6, 7, and 8).

The inner-side reinforcement member 60 is provided in the side sill inner front end part 17 and reinforces the side sill inner front end part 17. The inner-side reinforcement member 60 is joined to the inner front face part 171 and the inner-side side face part 14 of the inner front end rear part 172 in the side sill inner front end part 17 from inside the closed cross section 10s of the side sill 10 so as to diagonally couple them to each other.

Specifically, as illustrated in the drawings such as FIGS. 5, 6, 8, and 9, the inner-side reinforcement member 60 includes: an inner-side reinforcement member front part 61 that extends horizontally in the vehicle width direction so as to be capable of being joined to the inner front face part 171; an inner-side reinforcement member side face part 62 that extends horizontally in the front-rear direction so as to be capable of being joined to the inner-side side face part 14; and a diagonal part 63 that extends horizontally from a front end of the inner-side reinforcement member side face part 62 to an inner end in the vehicle width direction of the inner-side reinforcement member front part 61 so as to incline outward in the vehicle width direction as it extends forward. A portion of the inner-side reinforcement member 60 that straddles the inner vertical ridge line 141 in a direction in which the inner-side reinforcement member extends, that is, the diagonal part 63 is provided so as to be located away from the inner vertical ridge line 141 toward the inner side of the closed cross section 10s.

A bead 64 that protrudes inward in the vehicle width direction is provided at an intermediate position in the vertical direction of the inner-side reinforcement member 60. As illustrated in FIGS. 5, 6, and 9, the bead 64 is formed so as to extend continuously over a part in the direction in which the inner-side reinforcement member 60 extends, at least over the diagonal part 63, and in this example, extend continuously over the entire length of the inner-side reinforcement member in the direction in which it extends. The inner-side reinforcement member 60 described above is formed to have a higher strength than the outer-side reinforcement member 50.

Note that, FIG. 9 is a horizontal cross-sectional view of the side sill front end part 31 taken at the level of the bead 64.

Figure 8:
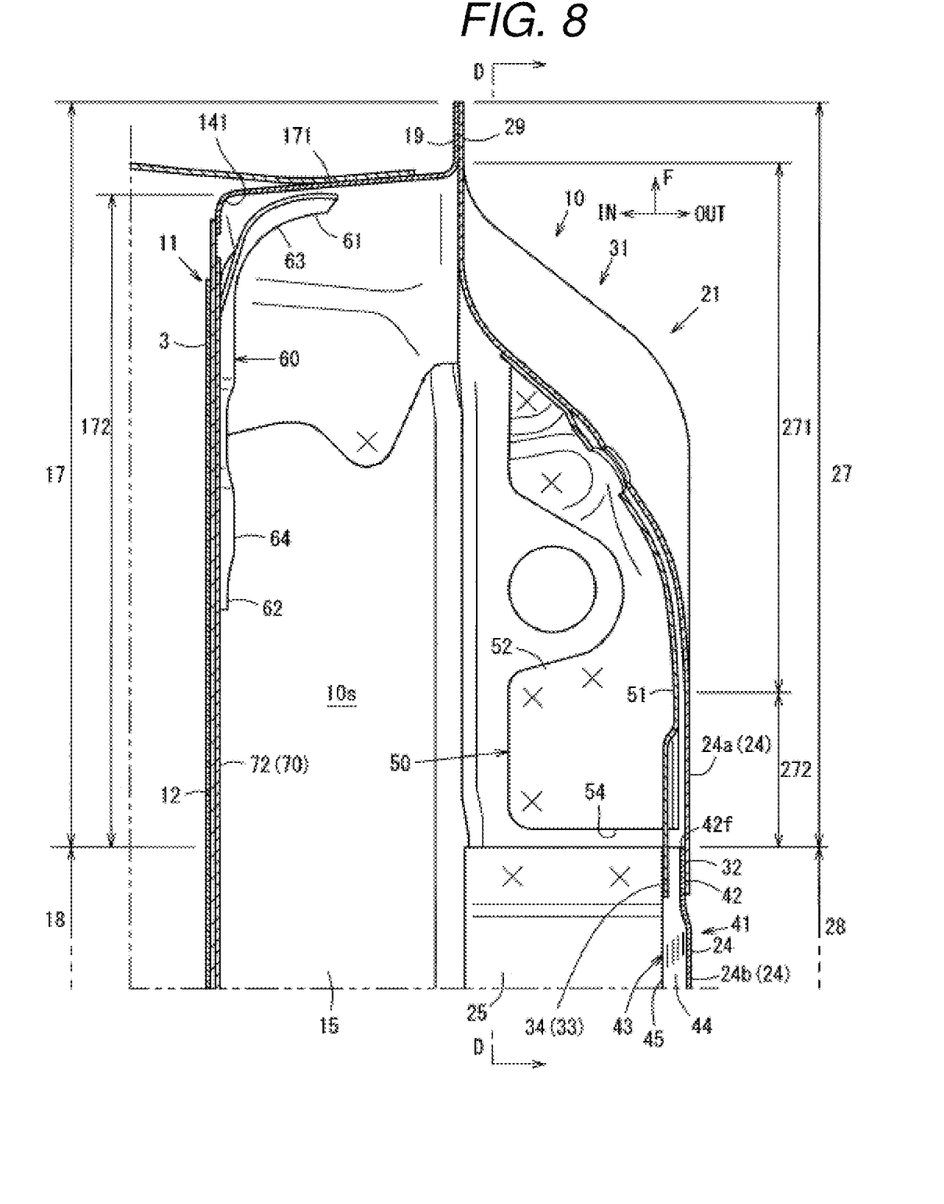
FIG. 8 is a cross-sectional view of the chief part taken along a line A-A of FIG. 2 or 4, viewed along an arrow direction.

In addition, as illustrated in the drawings such as FIGS. 6 and 8, the inner lateral ridge line reinforcement member 70 described above extends along the inner lateral ridge line 142 located in the boundary part between the inner-side upper face part 12 and the inner-side side face part 14. Further, the inner lateral ridge line reinforcement member 70 includes an inner-side reinforcement upper wall 71 and an inner-side reinforcement vertical face 72, and is formed so that its cross section taken along the plane orthogonal to the longitudinal direction, in which an inner end in the vehicle width direction of the inner-side reinforcement upper wall 71 and an upper end of the inner-side reinforcement vertical face 72 are formed integrally, has an L shape.

By joining the inner-side reinforcement upper wall 71 to the inner-side upper face part 12 and joining the inner-side reinforcement vertical face 72 to the inner-side side face part 14 in a corner part between the inner-side upper face part 12 and the inner-side side face part 14 of the side sill inner 11, the inner lateral ridge line reinforcement member 70 reinforces the inner lateral ridge line 142 located in the boundary part between the inner-side upper face part 12 and the inner-side side face part 14.

As illustrated in FIGS. 1 and 2, the vehicle-body lower structure 1 of a vehicle of this embodiment described above includes the side sill 10 that is disposed in a lower part and on the outer side in the vehicle width direction of the vehicle and the wheel 6 that is located ahead of the side sill outer 21.

By the side sill inner 11 located on the inner side in the vehicle width direction and the side sill outer 21 located on the outer side in the vehicle width direction collaborating with each other, the side sill 10 forms the closed cross section 10s that extends in the front-rear direction of the vehicle (see FIG. 3). In addition, the side sill outer 21 has the side sill outer front end part 27 and the side sill outer main body part 28.

In addition, as illustrated in FIGS. 3 to 5 and FIGS. 7 to 9, the vehicle-body lower structure 1 of a vehicle of this embodiment includes the outer-side reinforcement member 50 that has a shape extending along the outer-side side face part 24a (a side face part) of the outer front face part 271 (a front face part) and the outer front end rear part 272 in the side sill outer front end part 27 (a front end part of the side sill outer 21). The outer-side reinforcement member 50 is attached to the side sill outer front end part 27 from inside the closed cross section 10s while being substantially superimposed thereon.

Further, as illustrated in FIGS. 3, 4, and 9, in the vehicle-body lower structure 1 of a vehicle of this embodiment, the front end 42f of the outer-side side face part 24b of the side sill outer main body part 28 is opposed to the rear end 54 of the outer-side side face reinforcement part 51 (a side face part) of the outer-side reinforcement member 50 in the front-rear direction of the vehicle.

Furthermore, as illustrated in the drawings such as FIG. 7, the outer-side side face part 24b of the side sill outer main body part 28 is characterized in that it is disposed outward in the vehicle width direction of (specifically, closer to the outer-side side face part 24a of the side sill outer front end part 27 than) the rear end 54 of the outer-side side face reinforcement part 51 of the outer-side reinforcement member 50 in the vehicle width direction, and that it has the outer-side protrusion part 43 that protrudes inward in the vehicle width direction (to the side opposite the side of the outer-side side face part 24a of the side sill outer front end part 27) relative to the rear end 54.

In other words, the outer-side protrusion part 43 is formed so as to straddle the rear end 54 of the outer-side side face reinforcement part 51 of the outer-side reinforcement member 50 in the vehicle width direction (see FIG. 7).

Thus, the outer-side protrusion part 43 of the side sill outer main body part 28 has a configuration such that the front end 42f engages with the rear end 54 of the outer-side reinforcement member 50 pulled back when a rearward collision load is input to the side sill front end part 31.

The working effects of the vehicle-body lower structure 1 of a vehicle described above will be described using FIGS. 10A-10C.

Figures 10A, 10B, 10C:
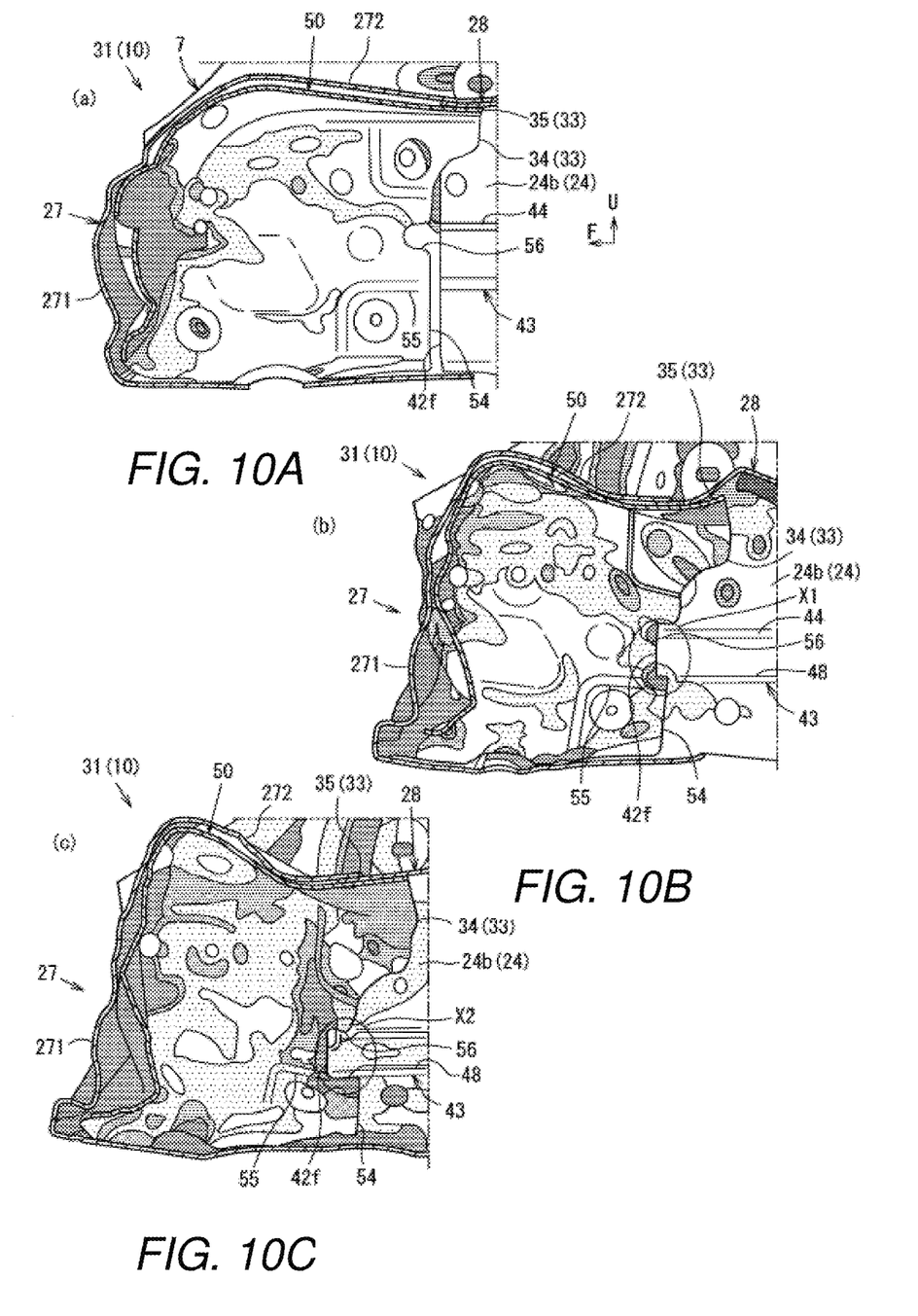
FIGS. 10A-10C are vertical cross-sectional views illustrating a simulation analysis result of behaviors of the vehicle's side sill front end part at the time of a small overlap collision.

FIGS. 10A-10C are cross-sectional views illustrating, based on a cross-sectional view taken along a line D-D of FIG. 8 and viewed along an arrow direction, a simulation analysis result of behaviors of the side sill outer front end part 27 observed when a collision load is input thereto at the time of a small overlap collision. FIG. 10A illustrates a collision initial phase, FIG. 10B illustrates a collision intermediate phase, and FIG. 10C illustrates a collision later phase, respectively. Dots in this drawing indicate a stress distribution image, and a portion where dots are denser indicates higher stress (collision energy).

Once the wheel 6 pulled back at the time of the small overlap collision mainly collides with the side sill outer front end part 27, as illustrated in FIG. 10A, a collision load directed to the rear side of the vehicle is input to the side sill outer front end part 27. Here, since including the outer-side reinforcement member 50, the side sill outer front end part 27 is displaced rearward together with the outer-side reinforcement member 50 while keeping its shape.

As illustrated in FIG. 10B, the rear end 54 of the outer-side reinforcement member 50 pulled back comes into contact with and thereby engages with the front end 42f of the outer-side protrusion part 43 provided to the side sill outer main body part 28. Note that, FIG. 10B illustrates a state immediately after the contact of the rear end 54 of the outer-side reinforcement member 50 pulled back and the front end 42f of the outer-side protrusion part 43 with each other.

In other words, as illustrated by an area X1 in FIG. 10B and an area X2 in FIG. 10C, stress is concentrated on a portion where the rear end 54 of the outer-side reinforcement member 50 and the front end 42f of the outer-side protrusion part 43 engage with each other, so that the load is transmitted from the rear end 54 of the outer-side reinforcement member 50 to the front end 42f of the outer-side protrusion part 43 provided to the side sill outer main body part 28.

Accordingly, as illustrated in FIG. 10C, before being crushed completely by a collision load input from the front side, the side sill outer front end part 27 can transmit the collision load to the side sill outer main body part 28 located there behind efficiently through the outer-side reinforcement member 50.

In addition, the collision load input from the front side can be transmitted to the rear side efficiently using the side sill outer main body part 28 located there behind even though the outer-side reinforcement member 50 is not provided to extend rearward of the side sill outer front end part 27 in the side sill outer 21, so that an increase in mass and cost can be suppressed.

Accordingly, it is possible to transmit the collision load, having been input from the front side to the side sill front end part 31, to the rear side of the side sill 10 efficiently without an increase in mass and cost.

As an aspect of the present disclosure, as illustrated in FIGS. 3 to 5 and FIGS. 7 and 8, the outer-side side face reinforcement part 51 of the outer-side reinforcement member 50 is provided with the extension part 33 that extends rearward of the front end 42f of the side sill outer main body part 28.

According to the above configuration, when the outer-side reinforcement member 50 is pulled back by a collision load directed to the rear side of the vehicle having been input to the side sill front end part 31, the extension part 33 can engage with the outer-side side face part 24b (a side face part) of the side sill outer main body part 28 in the vehicle width direction and thereby restrict movement of the outer-side reinforcement member 50 in the vehicle width direction relative to the side sill outer main body part 28.

Accordingly, it is possible to cause the rear end 54 of the outer-side reinforcement member 50 pulled back and the front end 42f of the outer-side protrusion part 43 provided to the side sill outer main body part 28 to engage with each other more reliably and thereby enhance the load transmission efficiency from the outer-side reinforcement member 50 to the side sill outer main body part 28.

As another aspect of the present disclosure, as illustrated in FIGS. 3, 4, 8, and 9, the outer-side protrusion part 43 is formed in a bead shape that extends continuously in the front-rear direction in the side sill outer main body part 28.

By forming the outer-side protrusion part 43 in a bead shape in this manner, it is possible to enhance the load transmission efficiency of the side sill outer main body part 28 in the front-rear direction.

As illustrated in FIG. 4, in the outer-side side face reinforcement part 51 of the outer-side reinforcement member 50, the reinforcement member lateral ridge line 55 that extends continuously forward from the rear end 54 is formed to have substantially the same height as the protrusion part lower-side lateral ridge line 48 (a protrusion part lateral ridge line) that extends in the front-rear direction in the outer-side protrusion part 43.

According to the above configuration, when a rearward collision load is input to the side sill front end part 31, as illustrated in FIG. 10A and FIG. 10B, the outer-side reinforcement member 50 is pulled back, which causes the reinforcement member lateral ridge line 55 and the protrusion part lower-side lateral ridge line 48 having the same height to extend so as to be continuous in the front-rear direction of the vehicle.

In other words, the rear end 54 of the outer-side side face reinforcement part 51 of the outer-side reinforcement member 50, which is enhanced in rigidity by the reinforcement member lateral ridge line 55, and the front end 42f of the outer-side protrusion part 43 of the side sill outer main body part 28, which is enhanced in rigidity by the protrusion part lower-side lateral ridge line 48, engage with each other (come into contact with each other) firmly. Thus, it is possible to enhance the load transmission efficiency from the outer-side reinforcement member 50 to the side sill outer main body part 28.

As still another aspect of the present disclosure, as illustrated in FIGS. 4 and 7, the outer lateral ridge line 241 that extends in the front-rear direction is formed in the boundary part between the outer-side upper face part 22 and the outer-side side face part 24b of the side sill outer main body part 28, and as illustrated in FIGS. 3, 4, 7, and 8, the extension part 33 has such a configuration as to extend rearward along the outer lateral ridge line 241 so as to be capable of engaging with the outer-side upper face part 22 and the outer-side side face part 24b of the side sill outer main body part 28.

According to the above configuration, when the outer-side reinforcement member 50 is pulled back by a rearward collision load having been input to the side sill front end part 31, the extension part 33 engages with not only the outer-side side face part 24b but also the outer-side upper face part 22 of the side sill outer main body part 28. Thus, it is possible to restrict movement of the outer-side reinforcement member 50 in the vehicle width direction and also in the vertical direction relative to the side sill outer main body part 28.

This inhibits the height positions of the reinforcement member lateral ridge line 55 and the protrusion part lower-side lateral ridge line 48 from becoming out of alignment relative to each other when the outer-side reinforcement member 50 is pulled back, and thereby enables the reinforcement member lateral ridge line 55 and the protrusion part lower-side lateral ridge line 48 to extend so as to be continuous in the front-rear direction of the vehicle more reliably.

As still another aspect of the present disclosure, as illustrated in FIGS. 3, 4, and 7, the outer-side protrusion part 43 has the upper wall part 44 and the lower wall part 46 (a pair of lateral wall parts) that extend in the vehicle width direction while being spaced from each other in the vertical direction of the vehicle, and as illustrated in the drawings such as FIG. 7, both the upper wall part 44 and the lower wall part 46 overlap with the rear end 54 of the outer-side reinforcement member 50 in a front view of the vehicle (see the areas Z1 and Z2 in FIG. 7).

According to the above configuration, since both the upper wall part 44 and the lower wall part 46 overlap with the rear end 54 of the outer-side reinforcement member 50 when the vehicle is seen from the front, it is possible to cause the rear end 54 of the outer-side reinforcement member 50 pulled back and the front end 42f of the outer-side protrusion part 43 of the side sill outer main body part 28 to engage with each other (come into contact with each other) reliably when a rearward collision load is input to the side sill front end part 31.

Accordingly, it is possible to enhance the load transmission efficiency from the outer-side reinforcement member 50 to the side sill outer main body part 28.

As still another aspect of the present disclosure, as illustrated in FIGS. 3, 4, and FIG. 10A, the rear end concave part 56 that is concave forward from the rear end 54 is formed at a height position coinciding with at least a part of the upper wall part 44 of the outer-side protrusion part 43 in the vertical direction.

According to the above configuration, when the outer-side reinforcement member 50 is pulled back by a collision load directed to the rear side of the vehicle having been input to the side sill front end part 31, as illustrated in FIG. 10B, the circumferential edge of the rear end concave part 56 engages with the upper wall part 44 of the outer-side protrusion part 43.

Accordingly, it is possible to cause the rear end 54 of the outer-side reinforcement member 50 pulled back and the outer-side protrusion part 43 provided to the side sill outer main body part 28 to engage with each other more reliably and thereby enhance the load transmission efficiency from the outer-side reinforcement member 50 to the side sill outer main body part 28.

As still another aspect of the present disclosure, as illustrated in FIG. 2, a longitudinal boundary between the side sill outer front end part 27 and the side sill outer main body part 28 is located at a position within the longitudinal width of the hinge pillar 7 that extends upward from the side sill 10.

According to the above configuration, the lower part of the hinge pillar 7 is connected to the side sill 10 while extending across the side sill outer front end part 27 and the side sill outer main body part 28. Thus, when a rearward collision load is input to the side sill front end part 31, the load can be transmitted more reliably from the side sill front end part 31 to the side sill outer main body part 28 located on the rear side of the vehicle.

In addition, in the above embodiment, as illustrated in FIGS. 3 to 5 and FIGS. 7 to 9, the outer-side reinforcement member 50 is provided to the side sill outer front end part 27 from inside the closed cross section 10s.

According to the above configuration, it is possible to make the outer-side reinforcement member 50 more compact and simpler in shape than the case where the outer-side reinforcement member 50 is provided to the side sill outer front end part 27 from outside the closed cross section 10s, and thereby suppress its weight increase. Further, even in the case of forming the outer-side reinforcement member 50 by molding, it is possible to mold the outer-side reinforcement member easily because its material does not need to be elongated as compared to the case where the outer-side reinforcement member 50 is provided to the side sill outer front end part 27 from outside the closed cross section 10s.

However, the present disclosure is not limited to the above embodiment. For example, the present disclosure does not exclude a configuration in which the outer-side reinforcement member 50 is provided to the side sill outer front end part 27 from outside the closed cross section 10s.

In this case, it means the extension part 33 is also disposed outside the closed cross section 10s relative to the side sill outer main body part 28. In addition, the outer-side protrusion part 43 protrudes to the outer side of the closed cross section 10s relative to the side sill outer main body part 28. Specifically, the outer-side protrusion part 43 protrudes, relative to the rear end 54 of the outer-side side face reinforcement part 51 of the outer-side reinforcement member 50, from the side of the side sill outer front end part 27 to the side opposite the side sill outer front end part 27 in the vehicle width direction (to the outer side in the vehicle width direction).

In this way, the present disclosure is not limited only to the configuration of the above embodiment and can be formed by various embodiments.

DESCRIPTION OF REFERENCE SIGNS AND NUMERALS

1 VEHICLE-BODY LOWER STRUCTURE OF VEHICLE
6 WHEEL
7 HINGE PILLAR
10 SIDE SILL
10s CLOSED CROSS SECTION
11 SIDE SILL INNER
21 SIDE SILL OUTER
22 OUTER-SIDE UPPER FACE PART (UPPER FACE PART OF MAIN BODY PART)
24a (24) OUTER-SIDE SIDE FACE PART OF SIDE SILL OUTER FRONT END PART (SIDE FACE PART OF FRONT END PART OF SIDE SILL OUTER)
24b (24) OUTER-SIDE SIDE FACE PART OF SIDE SILL OUTER MAIN BODY PART (SIDE FACE PART OF MAIN BODY PART OF SIDE SILL OUTER)
27 SIDE SILL OUTER FRONT END PART (FRONT END PART OF SIDE SILL OUTER)
28 SIDE SILL OUTER MAIN BODY PART (MAIN BODY PART OF SIDE SILL OUTER)
33 EXTENSION PART
42f FRONT END OF SIDE SILL OUTER MAIN BODY PART (FRONT END OF MAIN BODY PART)
43 OUTER-SIDE PROTRUSION PART (PROTRUSION PART)
44, 46 UPPER WALL PART AND LOWER WALL PART OF OUTER-SIDE PROTRUSION PART (PAIR OF LATERAL WALL PARTS)
45 VERTICAL WALL PART
48 PROTRUSION PART LOWER-SIDE LATERAL RIDGE LINE (PROTRUSION PART LATERAL RIDGE LINE)
50 OUTER-SIDE REINFORCEMENT MEMBER
51 OUTER-SIDE SIDE FACE REINFORCEMENT PART OF OUTER-SIDE REINFORCEMENT MEMBER (SIDE FACE PART OF OUTER-SIDE REINFORCEMENT MEMBER)
54 REAR END OF OUTER-SIDE REINFORCEMENT MEMBER
55 REINFORCEMENT MEMBER LATERAL RIDGE LINE
56 REAR END CONCAVE PART
241 OUTER LATERAL RIDGE LINE
271 OUTER FRONT FACE PART (FRONT FACE PART OF SIDE SILL OUTER)

The invention claimed is:
1. A vehicle-body lower structure of a vehicle comprising:
a side sill that is disposed in a lower part and on an outer side in a vehicle width direction of a vehicle and has a side sill inner structure located on an inner side in the vehicle width direction and a side sill outer structure located on the outer side in the vehicle width direction and having a front end part and a main body part, the side sill inner structure and the side sill outer structure collaborating with each other to form a closed cross section that extends in a front-rear direction of the vehicle;

a wheel that is located ahead of the side sill outer structure in the front-rear direction of the vehicle; and an outer-side reinforcement structure that has a shape extending along a front face part and a side face part in the front end part of the side sill outer structure, wherein the outer-side reinforcement structure is attached to the front end part from inside the closed cross section or from outside the closed cross section, a front end of the main body part is opposed to a rear end of the side face part of the outer-side reinforcement structure in the front-rear direction of the vehicle, and the main body part is disposed closer to the side face part of the front end part than the rear end of the side face part of the outer-side reinforcement structure in the vehicle width direction, and has a protrusion part that protrudes to a side opposite the side of the side face part of the front end part relative to the rear end.

2. The vehicle-body lower structure of a vehicle according to claim 1, wherein the side face part of the outer-side reinforcement structure is provided with an extension part that extends rearward of the front end of the main body part.

3. The vehicle-body lower structure of a vehicle according to claim 2, wherein the protrusion part is formed by a bead that extends in the front-rear direction in the main body part.

4. The vehicle-body lower structure of a vehicle according to claim 3, wherein, in the side face part of the outer-side reinforcement structure, a reinforcement structure lateral ridge line that extends continuously forward from the rear end is formed to have substantially a same height as a protrusion part lateral ridge line that extends in the front-rear direction in the protrusion part.

5. The vehicle-body lower structure of a vehicle according to claim 4, wherein an outer lateral ridge line that extends rearward from the front end of the main body part is formed in a boundary part between an upper face part and a side face part of the main body part, and the extension part has such a configuration as to extend rearward along the outer lateral ridge line so as to be capable of engaging with the upper face part and the side face part of the main body part.

6. The vehicle-body lower structure of a vehicle according to claim 5, wherein the protrusion part has a pair of lateral wall parts that extend in the vehicle width direction while being spaced from each other in a vertical direction of the vehicle, and at least one of the pair of lateral wall parts overlaps with the rear end of the outer-side reinforcement structure in a front view of the vehicle.

7. The vehicle-body lower structure of a vehicle according to claim 6, wherein a rear end concave part that is concave forward from the rear end is formed in the outer-side reinforcement structure at the same height position as at least one of the pair of lateral wall parts of the protrusion part.

8. The vehicle-body lower structure of a vehicle according to claim 1, wherein the outer-side reinforcement structure is provided to the front end part from inside the closed cross section.

9. The vehicle-body lower structure of a vehicle according to claim 7, wherein a boundary in the front-rear direction of the vehicle between the front end part and the main body part of the side sill outer is located at a position within a longitudinal width of a hinge pillar that extends upward from the side sill.

10. The vehicle-body lower structure of a vehicle according to claim 8, wherein a boundary in the front-rear direction of the vehicle between the front end part and the main body part of the side sill outer is located at a position within a longitudinal width of a hinge pillar that extends upward from the side sill.

11. The vehicle-body lower structure of a vehicle according to claim 1, wherein the protrusion part is formed by a bead that extends in the front-rear direction in the main body part.

12. The vehicle-body lower structure of a vehicle according to claim 1, wherein, in the side face part of the outer-side reinforcement structure, a reinforcement structure lateral ridge line that extends continuously forward from the rear end is formed to have substantially a same height as a protrusion part lateral ridge line that extends in the front-rear direction in the protrusion part.

13. The vehicle-body lower structure of a vehicle according to claim 1, wherein the protrusion part has a pair of lateral wall parts that extend in the vehicle width direction while being spaced from each other in a vertical direction of the vehicle, and at least one of the pair of lateral wall parts overlaps with the rear end of the outer-side reinforcement structure in a front view of the vehicle.

14. The vehicle-body lower structure of a vehicle according to claim 1, wherein a boundary in the front-rear direction of the vehicle between the front end part and the main body part of the side sill outer is located at a position within a longitudinal width of a hinge pillar that extends upward from the side sill.

* * * * *